United States Patent
Mammen et al.

(10) Patent No.: US 7,084,191 B2
(45) Date of Patent: Aug. 1, 2006

(54) INK COMPOSITION RESISTANT TO SOLVENT EVAPORATION

(75) Inventors: Thomas Mammen, La Verne, CA (US); Robert Valadez, Azusa, CA (US)

(73) Assignee: Avery Dennison Corporation, Pasadena, CA (US)

( * ) Notice: Subject to any disclaimer, the term of this patent is extended or adjusted under 35 U.S.C. 154(b) by 81 days.

(21) Appl. No.: 10/325,138

(22) Filed: Dec. 20, 2002

(65) Prior Publication Data

US 2004/0122129 A1 Jun. 24, 2004

(51) Int. Cl.
*C09D 11/16* (2006.01)
*C08L 91/00* (2006.01)

(52) U.S. Cl. .................. 523/161; 524/310; 524/611

(58) Field of Classification Search ........... 523/160, 523/161; 106/31.57, 31.85; 524/611
See application file for complete search history.

(56) References Cited

U.S. PATENT DOCUMENTS

| | | | | |
|---|---|---|---|---|
| 4,248,636 A | * | 2/1981 | Sasaki et al. ............ | 106/31.57 |
| 5,174,814 A | | 12/1992 | Burwell et al. | |
| 5,849,815 A | * | 12/1998 | Aoki et al. .................. | 523/161 |
| 5,905,102 A | * | 5/1999 | Nagasawa et al. .......... | 523/161 |
| 6,028,180 A | * | 2/2000 | Shawcross et al. ......... | 534/685 |
| 6,087,416 A | * | 7/2000 | Pearlstine et al. .......... | 523/160 |
| 6,528,557 B1 | * | 3/2003 | Lin ............................. | 523/160 |
| 6,599,353 B1 | * | 7/2003 | Spencer et al. ............ | 106/31.6 |
| 6,749,675 B1 | * | 6/2004 | Momose .................. | 106/31.58 |
| 2002/0139280 A1 | * | 10/2002 | Ichikawa .................. | 106/31.43 |
| 2002/0157569 A1 | * | 10/2002 | Takemoto et al. ........ | 106/31.86 |

FOREIGN PATENT DOCUMENTS

| | | |
|---|---|---|
| EP | 0821276 A | 1/1998 |
| EP | 1031431 A | 8/2000 |
| JP | 06248217 A * | 9/1994 |
| WO | WO 00/08102 | 2/2000 |

OTHER PUBLICATIONS

Machine Translation of JP 06248217 A (1994).*

* cited by examiner

*Primary Examiner*—Callie Shosho
(74) *Attorney, Agent, or Firm*—Law Office of Joel D. Voelzke

(57) ABSTRACT

The present invention is directed to an ink composition resistant to solvent evaporation which may be employed for use in retractable permanent marker pens. Generally, the ink composition of the present invention comprises n-propanol, a pyrrolidone, a tryglyceride, a terpene phenolic resin, and at least one colorant to yield a detectable color when the ink composition is applied to a writable substrate. Additionally, the ink composition may further comprise at least one of polyether modified dimethylpolysiloxane copolymer and silicone glycol surfactant. Optionally, the ink composition may further comprise water.

24 Claims, No Drawings

INK COMPOSITION RESISTANT TO SOLVENT EVAPORATION

BACKGROUND

This invention is directed to ink compositions resistant to solvent evaporation, particularly for use in permanent marker pens and other marker devices, such as retractable permanent marker pens.

Current permanent marker pens employ inks made with a solvent base system. These markers have at least one end that forms the marking or writing tip, also known as the nib. The solvent from the ink will evaporate upon usage, thus causing the marker pen to "dry out". To avoid solvent evaporation, traditional permanent marker pens require a tightly fitted cap over the nib portion of the marker pen to prevent the marker pen from drying out.

One performance indicator of a marker pen is the cap-off performance which measures the markers ability to mark with ink after the cap has been off for a particular amount of time. Traditionally, after less than 2 (two) hours, the ink will dry up, thus yielding a low cap-off performance. Due to the need for a cap to prevent dry-out, it is difficult to create a retractable permanent marker pen that does not require a cap.

RELATED INVENTIONS

Assignee has a co-pending provisional application with Ser. No. 60/435,266, filed concurrently with the present invention on Dec. 20, 2002, entitled ENCLOSING VALVE FOR A WRITING INSTRUMENT, which is directed to permanent marker pen construction and which may be employed with the ink of the present invention; the disclosure of which is incorporated herein by reference.

INVENTION SUMMARY

The present invention is directed to an ink composition resistant to solvent evaporation. Since the ink composition resists evaporation of the solvent, it is not necessary to employ the ink for use in a marker pen having a tightly fitted cap. Rather, the ink of the present invention may be employed for use in retractable permanent marker pens.

Generally, the ink composition of the present invention comprises n-propanol, a pyrrolidone, a tryglyceride, a terpene phenolic resin, and at least one colorant to yield a detectable color when the ink composition is applied to a writable substrate. Additionally, the ink composition may further comprise at least one of polyether modified dimethylpolysiloxane copolymer and silicone glycol surfactant. Optionally, the ink composition may further comprise water.

The ink composition of the present invention is mixed at a temperature from about 100 degrees to 130 degrees Fahrenheit.

In an alternative embodiment of the invention, the ink composition resistant to solvent evaporation comprises from about 50% to about 90% of n-propanol, from about 0.1% to about 10% of 2-pyrrolidone, from about 0.1% to about 3% of a vegetable derived modified tryglyceride, from about 5% to about 15% of a terpene phenolic resin, from about 0.1% to about 2% of a polyether modified dimethylpolysiloxane copolymer, from about 0.1% to about 2% of a silicone glycol surfactant, and from about 5% to about 40% of at least one colorant to yield a detectable color when the ink composition is applied to a writable substrate.

In a different alternative embodiment of the invention, the ink composition resistant to solvent evaporation comprises from about 60% to about 85% of n-propanol, from about 2% to about 8% 2-pyrrolidone, from about 0.1% to about 1% of a vegetable derived modified tryglyceride, from about 5% to about 10% of a terpene phenolic resin, from about 0.1% to about 1% of a polyether modified dimethylpolysiloxane copolymer, from about 0.1% to about 1% of a silicone glycol surfactant, and from about 7% to about 30% of at least one colorant to yield a detectable color when the ink composition is applied to a writable substrate.

DETAILED DESCRIPTION OF THE INVENTION

In current permanent ink marker pens, if the marker pen is left uncapped for a short time the nib will dryout (solvent evaporates) and is not usable. Thus, it can be stated that current permanent ink marker pens have poor cap-off performance, meaning current permanent ink marker pens perform poorly if the cap remains off of the marker pen for too long of a time. An airtight cap is a necessity for marker pens having poor cap-off performance.

Due to the high volume of permanent marker uses in the industry, it is essential to develop an ink composition resistant to solvent evaporation which can be used in a variety of marker products without caps. The ink composition of the present invention protects the ink from drying when the marker is left uncapped. The ink composition allows for the formation of a soft skin (like a crystal) on the outer surface of the marker tip (nib) slowing or preventing evaporation of solvent. When the tip (nib) touches a writing surface the soft thin skin breaks allowing ink to flow. When writing is finished, the sealing skin is restored. Therefore, a marker can be left without a cap for a long period of time and still be usable. The ink composition of the present invention may also be employed in marker pens not having a cap, such as retractable permanent marker pens.

In general, an ink composition resistant to solvent-evaporation according to the present invention comprises a main carrier solvent, a glyceride, a pyrrolidone, a resin and a colorant.

The main carrier solvent may be any alcohol. In one embodiment of the invention, a propanol was used as the main carrier solvent. Optionally, in a different embodiment of the invention, n-propanol may be used as the main carrier solvent.

Additionally, in a separate embodiment of the invention, water can be added as an additional solvent.

Glyceride is one component of the invention used to extend the cap-off performance of the ink composition in a marker pen. The glyceride may be selected from a group consisting of monoglyceride, diglyceride and tryglyceride. In one embodiment of the invention the ink composition comprises tryglyceride. Optionally, the tryglyceride may be a vegetable derived modified tryglyceride. Alternatively, the tryglyceride has a weight-average molecular weight from about 500 to about 1000. In one embodiment of the invention, the tryglyceride has a weight-average molecular weight of about 740. A suitable such tryglyceride is marketed by Multichem Ltd. England as a Cap-Off Additive, which Multichem calls a blend of "vegetable derived modified tryglycerides."

Pyrrolidone is used in combination with a glyceride, such as tryglyceride, to further extend the cap-off performance of the ink composition in a marker pen. The pyrrolidone may be selected from the group consisting of 2-pyrrolidone and 3-pyrrolidone. Optionally, the pyrrolidone selected may be 2-pyrrolidone.

In the present invention, the ink composition comprises a terpene phenolic resin. Optionally, the resin has a weight-average molecular weight of about 696. A suitable such resin is marketed by Arizona Chemical Company as SYLVARES TP 2040 Resin.

One or more surfactant additives may be employed to enhance the surface tension characteristic of the ink composition. For example, in one embodiment of the invention the ink composition further comprises a polyether modified dimethylpolysiloxane copolymer. The polyether modified dimethylpolysiloxane copolymer has a weight-average molecular weight from about 300 to about 700. A suitable such copolymer is marketed by BYK-Chemie USA as a BYK-307 Additive. Alternatively, in a different embodiment of the invention, the ink composition further comprises a surfactant additive such as a silicone glycol surfactant. The silicone glycol surfactant has a weight-average total molecular weight from about 1000 to about 2500. Optionally, the silicone glycol surfactant has a weight-average total molecular weight of about 2160. A suitable such surfactant is marketed by Dow Corning Corporation as a Dow Corning 29 Additive. Optionally, in a separate different embodiment of the invention, the ink composition comprises both the polyether modified dimethylpolysiloxane copolymer and the silicone glycol surfactant.

Colorants are used to give the ink composition a desired color. A plethora of colors may be achieved as would be obvious to one skilled in the art. In one embodiment of the invention, the ink composition comprises a metal complexed azo dye to yield a specific color. For example such colors include but are not limited to black, blue, green, red, purple, and orange. Suitable dyes for yielding such colors are marketed by United Color Manufacturing, Inc. respectively as Uniflow Black 1804 Dye, Uniflow Blue 2046 Dye, Uniflow Green 2061 Dye, Uniflow Red 2062 Dye, Uniflow Purple 2066 Dye, and Uniflow Orange 2065 Dye. Again, it would be obvious to one skilled in the art that alternative colorants could be employed to yield alternative dye colors.

In an alternative embodiment of the invention, the ink composition resistant to solvent evaporation comprises from about 50% to about 90% of n-propanol, from about 0.1% to about 10% of 2-pyrrolidone, from about 0.1% to about 3% of a vegetable derived modified tryglyceride, from about 5% to about 15% of a terpene phenolic resin, from about 0.1% to about 2% of a polyether modified dimethylpolysiloxane copolymer, from about 0.1% to about 2% of a silicone glycol surfactant, and from about 5% to about 40% of at least one colorant to yield a detectable color when the ink composition is applied to a writable substrate. Optionally, the ink composition may further comprise from about 0.1% to about 10% water.

In a different alternative embodiment, an ink composition resistant to solvent-evaporation comprises from about 60% to about 85% of n-propanol, from about 2% to about 8% 2-pyrrolidone, from about 0.1% to about 1% of a vegetable derived modified tryglyceride, from about 5% to about 10% of a terpene phenolic resin, from about 0.1% to about 1% of a polyether modified dimethylpolysiloxane copolymer, from about 0.1% to about 1% of a silicone glycol surfactant, and from about 7% to about 30% of at least one colorant to yield a detectable color when the ink composition is applied to a writable substrate. Optionally, the ink composition may further comprises from about 2% to about 8% water.

The ink compounding and preparation for the ink of the present invention are important. Traditional ink compositions are prepared at normal room temperature. The ink composition of the present invention is prepared at higher than normal temperature. For example, in an embodiment of the invention, the ink composition may be prepared by mixing the solvent, resin, tryglyceride and pyrrolidone at a temperature between 100 and 130 degrees Fahrenheit. The temperature is maintained within this range for the remainder of the compounding process. Next, the colorant, or dye is added. Finally, additive may be added. Optionally, the ink composition may be prepared at a temperature of about 120 degrees Fahrenheit.

Another different embodiment of the invention provides for an ink composition resistant to solvent evaporation for use in a marker pen having a reservoir for holding the ink composition, a channel for applying ink from the reservoir to a writable substrate. The ink composition comprises n-propanol, a pyrrolidone selected from the group consisting of 2-pyrrolidone and 3-pyrrolidone, a tryglyceride, a terpene phenolic resin, optionally, a polyether modified dimethylpolysiloxane copolymer, optionally, a silicone glycol surfactant, and at least one colorant to yield a detectable color when the ink composition is applied to a writable substrate.

The invention is illustrated by the following Examples. These Examples are for illustrative purposes only and are not intended to limit the invention.

EXAMPLE 1

TABLE 1(a)

Permanent Ink with Black Color

| Ingredient | Weight % |
|---|---|
| n-propanol | 68.50 |
| 2-pyrrolidone | 3.0 |
| Cap Master CA 340.2 | 1.0 |
| Silverez TP 2040 | 6.0 |
| Uniflow Black 1804 | 21.00 |
| BYK Additive #307 | 0.40 |
| Dow Corning Additive #29 | 0.10 |

A permanent ink with black color is produced by mixing the ingredients in Table 1(a).

TABLE 1(b)

Characteristics of Permanent Ink with Black Color

| Specific Gravity | 0.852–0.864 |
|---|---|
| Pounds/Gallon | 7.15 |
| Viscosity (cps) | 4.6–50 |
| Surface tension | 22.0–24.0 |

The permanent ink with black color produced by mixing the ingredients in Table 1(a), had the characteristics shown in Table 1(b).

EXAMPLE 2

TABLE 2(a)

Permanent Ink with Blue Color

| Ingredient | Weight % |
|---|---|
| n-propanol | 69.50 |
| 2-pyrrolidone | 3.00 |
| Cap Master CA 340.2 | 1.00 |
| Silverez TP 2040 | 6.00 |
| Uniflow Blue 2046 | 20.00 |
| BYK Additive #307 | 0.40 |
| Dow Corning Additive #29 | 0.10 |

A permanent ink with blue color is produced by mixing the ingredients in Table 2(a).

TABLE 2(b)

Characteristics of Permanent Ink with Blue Color

| Specific Gravity | 0.850–0.860 |
|---|---|
| Pounds/Gallon | 7.20 |
| Viscosity (cps) | 3.5–4.0 |
| Surface tension | 22.0–22.4 |

The permanent ink with blue color produced by mixing the ingredients in Table 2(a), had the characteristics shown in Table 2(b).

EXAMPLE 3

TABLE 3(a)

Permanent Ink with Red Color

| Ingredient | Weight % |
|---|---|
| n-propanol | 67.50 |
| 2-pyrrolidone | 3.00 |
| Cap Master CA 340.2 | 1.00 |
| Silverez TP 2040 | 10.00 |
| Uniflow Red 2062 | 18.00 |
| BYK Additive #307 | 0.40 |
| Dow Corning Additive #29 | 0.10 |

A permanent ink with red color is produced by mixing the ingredients in Table 3(a).

TABLE 3(b)

Characteristics of Permanent Ink with Red Color

| Specific Gravity | 0.861–0.866 |
|---|---|
| Pounds/Gallon | 7.24 |
| Viscosity (cps) | 2.8–3.5 |
| Surface tension | 22.0–24.0 |

The permanent ink with red color produced by mixing the ingredients in Table 3(a), had the characteristics shown in Table 3(b).

EXAMPLE 4

TABLE 4(a)

Permanent Ink with Green Color

| Ingredient | Weight % |
|---|---|
| n-propanol | 62.50 |
| 2-pyrrolidone | 3.00 |
| Cap Master CA 340.2 | 1.00 |
| Silverez TP 2040 | 6.00 |
| Uniflow Green 2061 | 27.00 |
| BYK Additive #307 | 0.40 |
| Dow Corning Additive #29 | 0.10 |

A permanent ink with green color is produced by mixing the ingredients in Table 4(a).

TABLE 4(b)

Characteristics of Permanent Ink with Green Color

| Specific Gravity | 0.861–0.866 |
|---|---|
| Pounds/Gallon | 7.20 |
| Viscosity (cps) | 4.5–5.5 |
| Surface tension | 21.0–23.0 |

The permanent ink with green color produced by mixing the ingredients in Table 4(a), had the characteristics shown in Table 4(b).

EXAMPLE 5

TABLE (5)

Permanent Ink with Purple Color

| Ingredient | Weight % |
|---|---|
| n-propanol | 82.50 |
| 2-pyrrolidone | 3.00 |
| Cap Master CA 340.2 | 1.00 |
| Silverez TP 2040 | 6.00 |
| Uniflow Purple 2066 | 7.00 |
| BYK Additive #307 | 0.40 |
| Dow Corning Additive #29 | 0.10 |

A permanent ink with purple color is produced by mixing the ingredients in Table 5(a).

TABLE 5(b)

Characteristics of Permanent Ink with Purple Color

| Specific Gravity | 0.837–0.842 |
|---|---|
| Pounds/Gallon | 7.00 |
| Viscosity (cps) | 3.0–4.0 |
| Surface tension | 21.0–23.0 |

The permanent ink with purple color produced by mixing the ingredients in Table 5(a), had the characteristics shown in Table 5(b).

EXAMPLE 6

TABLE (6)

Permanent Ink with Orange Color

| Ingredient | Weight % |
|---|---|
| n-propanol | 71.50 |
| 2-pyrrolidone | 3.00 |
| Cap Master CA 340.2 | 1.00 |
| Silverez TP 2040 | 10.00 |

TABLE (6)-continued

Permanent Ink with Orange Color

| Ingredient | Weight % |
|---|---|
| Uniflow Orange 2065 | 14.00 |
| BYK Additive #307 | 0.40 |
| Dow Corning Additive #29 | 0.10 |

A permanent ink with orange color is produced by mixing the ingredients in Table 6(a).

TABLE 6(b)

| Characteristics of Permanent Ink with Orange Color | |
|---|---|
| Specific Gravity | 0.838–0.842 |
| Pounds/Gallon | 7.00 |
| Viscosity (cps) | 3.0–4.0 |
| Surface tension | 22.0–24.0 |

The permanent ink with orange color produced by mixing the ingredients in Table 6(a), had the characteristics shown in Table 6(b).

Additionally, the ink composition of the present invention may be employed for use in a retractable permanent marker pen. Cap-Off testing was done to analyze the performance of the ink composition of the present invention in retractable products. Cap-Off testing reflects the ability of markers to deliver ink after being exposed to air for specified periods of time. This test simulates the performance of markers as used by consumers. The procedure for the test is as follows. In step 1, a paper type is selected and a specified time for testing is determined. In step 2, on a Mark Evaluation Form of the selected paper type, four horizontal marks, each approximately 8 cm long, are made in an area of the form designated "Initial Mark". In step 3, one marker for each day of testing in the specified time period is placed in a horizontal position on a flat surface with the nib exposed. Note that if the specified time for testing is 0 days, then 10 markers will be placed in flat positions with the nib exposed. Step 4 spans the time period specified for testing. In step 4, on each day of testing, one marker is taken and used to make four horizontal marks, each approximately 8 cm long in a "Final Mark" box on the Mark Evaluation Form. Note the same marker used for the "Initial Mark" box must be used for the "Final Mark" box at the designated test time. Test markers are not reused. In step 5, the initial and final marks are compared for losses in intensity, line breaks or skips, and dry starts. Finally, in step 6, the cap off results are reported as a number of days. The ink composition of the present invention gave Cap-Off results ranging from 7-14 days.

The present invention is directed to an ink composition resistant to solvent evaporation which may be employed for use in retractable permanent marker pens. Generally, the ink composition of the present invention comprises n-propanol, a pyrrolidone, a tryglyceride, a terpene phenolic resin; and at least one colorant to yield a detectable color when the ink composition is applied to a writable substrate. Additionally, the ink composition may further comprise at least one of polyether modified dimethylpolysiloxane copolymer and silicone glycol surfactant. Optionally, the ink composition may further comprise water.

While the specification describes particular embodiments of the present invention, those of ordinary skill can devise variations of the present invention without departing from the inventive concept.

We claim:

1. An ink composition resistant to solvent-evaporation comprising:
   (a) n-propanol;
   (b) a pyrrolidone selected from the group consisting of 2-pyrrolidone and 3-pyrrolidone;
   (c) a tryglyceride;
   (d) a terpene phenolic resin;
   (e) at least one colorant to yield a detectable color when the ink composition is applied to a writable substrate; and
   (f) at least one of polyether modified dimethylpolysiloxane copolymer having a weight-average molecular weight from about 300 to about 700, or silicone glycol surfactant;
   wherein at least a portion of the ink composition is prepared at a temperature from about 100 degrees to 130 degrees Fahrenheit.

2. The ink composition of claim 1 wherein the silicone glycol surfactant has a weight-average molecular weight of 2160.

3. The ink composition of claim 1 wherein the ink composition further comprises water.

4. The ink composition of claim 1 wherein the ink composition is prepared at a temperature of about 120 degrees Fahrenheit.

5. The ink composition of claim 1 wherein the ink is disposed within a retractable permanent marker pen.

6. An ink composition resistant to solvent-evaporation comprising:
   (a) n-propanol;
   (b) a pyrrolidone selected from the group consisting of 2-pyrrolidone and 3-pyrrolidone;
   (c) a vegetable derived modified tryglyceride having a weight-average molecular weight from about 500 to about 1000;
   (d) a terpene phenolic resin; and
   (e) at least one colorant to yield a detectable color when the ink composition is applied to a writable substrate;
   wherein at least a portion of the ink composition is prepared at a temperature from about 100 degrees to 130 degrees Fahrenheit.

7. An ink composition resistant to solvent-evaporation comprising:
   (a) n-propanol;
   (b) a pyrrolidone selected from the group consisting of 2-pyrrolidone and 3-pyrrolidone;
   (c) a tryglyceride;
   (d) a terpene phenolic resin having a weight-average molecular weight of about 696; and
   (e) at least one colorant to yield a detectable color when the ink composition is applied to a writable substrate;
   wherein at least a portion of the ink composition is prepared at a temperature from about 100 degrees to 130 degrees Fahrenheit.

8. An ink composition resistant to solvent-evaporation comprising:
   (a) n-propanol;
   (b) a pyrrolidone selected from the group consisting of 2-pyrrolidone and 3-pyrrolidone;
   (c) a tryglyceride;
   (d) a terpene phenolic resin; and
   (e) a metal complexed azo dye colorant to yield a detectable color when the ink composition is applied to a writable substrate;
   wherein at least a portion of the ink composition is prepared at a temperature from about 100 degrees to 130 degrees Fahrenheit.

9. An ink composition resistant to solvent-evaporation comprising:
   (a) from about 50% to about 90% of n-propanol;
   (b) from about 0.1% to about 10% of 2-pyrrolidone;
   (c) from about 0.1% to about 3% of a vegetable derived modified tryglyceride;
   (d) from about 5% to about 15% of a terpene phenolic resin;
   (e) from about 0.1% to about 2% of a polyether modified dimethylpolysiloxane copolymer;
   (f) from about 0.1% to about 2% of a silicone glycol surfactant; and
   (g) from about 5% to about 40% of at least one colorant to yield a detectable color when the ink composition is applied to a writable substrate; and
   (h) from about 0.1% to about 10% of water.

10. The ink composition of claim 9 wherein the ink composition is prepared at a temperature from about 100 degrees to 130 degrees Fahrenheit.

11. The ink composition of claim 9 wherein the colorant is a metal complexed azo dye that produces a blue color.

12. The ink composition of claim 9 wherein the colorant is a metal complexed azo dye that produces a red color.

13. The ink composition of claim 9 wherein the colorant is a metal complexed azo dye that produces a green color.

14. The ink composition of claim 9 wherein the colorant is a metal complexed azo dye that produces a purple color.

15. The ink composition of claim 9 wherein the colorant is a metal complexed azo dye that produces a orange color.

16. An ink composition resistant to solvent-evaporation comprising:
   (a) from about 50% to about 90% of n-propanol;
   (b) from about 0.1% to about 10% of 2-pyrrolidone;
   (c) from about 0.1% to about 3% of a vegetable derived modified tryglyceride;
   (d) from about 5% to about 15% of a terpene phenolic resin;
   (e) from about 0.1% to about 2% of a polyether modified dimethylpolysiloxane copolymer;
   (f) from about 0.1% to about 2% of a silicone glycol surfactant; and
   (g) from about 5% to about 40% of a metal complexed azo dye that produces a detectable black color when the ink composition is applied to a writable substrate.

17. An ink composition resistant to solvent-evaporation comprising:
   (a) from about 60% to about 85% of n-propanol;
   (b) from about 2% to about 8% 2-pyrrolidone;
   (c) from about 0.1% to about 1% of a vegetable derived modified tryglyceride;
   (d) from about 5% to about 10% of a terpene phenolic resin;
   (e) from about 0.1% to about 1% of a polyether modified dimethylpolysiloxane copolymer;
   (f) from about 0.1% to about 1% of a silicone glycol surfactant; and
   (g) from about 7% to about 30% of at least one colorant to yield a detectable color when the ink composition is applied to a writable substrate.

18. The ink composition of claim 17 further comprising from about 2% to about 8% of water.

19. The ink composition of claim 17 comprising:
   (a) about 68.50% of n-propanol;
   (b) about 3% of 2-pyrrolidone;
   (c) about 1% of a vegetable derived modified tryglyceride;
   (d) about 6% of a terpene phenolic resin;
   (e) about 0.4% of a polyether modified dimethylpolysiloxane copolymer;
   (f) about 0.1% of a silicone glycol surfactant; and
   (g) about 21% of at least one colorant to yield a detectable black color when the ink composition is applied to paper.

20. The ink composition of claim 17 comprising:
   (a) about 69.50% n-propanol;
   (b) about 3% 2-pyrrolidone;
   (c) about 1% of a vegetable derived modified tryglyceride;
   (d) about 6% of a terpene phenolic resin;
   (e) about 0.4% of a polyether modified dimethylpolysiloxane copolymer;
   (f) about 0.1% of a silicone glycol surfactant; and
   (g) about 20% of at least one colorant to yield a detectable blue color when the ink composition is applied to paper.

21. The ink composition of claim 17 comprising:
   (a) about 67.50% of n-propanol;
   (b) about 3% of 2-pyrrolidone;
   (c) about 1% of a vegetable derived modified tryglyceride;
   (d) about 10% of a terpene phenolic resin;
   (e) about 0.4% of a polyether modified dimethylpolysiloxane copolymer;
   (f) about 0.1% of a silicone glycol surfactant; and
   (g) about 18% of at least one colorant to yield a detectable red color when the ink composition is applied to a writable substrate.

22. The ink composition of claim 17 comprising:
   (a) about 62.50% of n-propanol;
   (b) about 3% of 2-pyrrolidone;
   (c) about 1% of a vegetable derived modified tryglyceride;
   (d) about 6% of a terpene phenolic resin;
   (e) about 0.4% of a polyether modified dimethylpolysiloxane copolymer;
   (f) about 0.1% of a silicone glycol surfactant; and
   (g) about 27% of at least one colorant to yield a detectable green color when the ink composition is applied to paper.

23. The ink composition of claim 17 comprising:
   (a) about 82.50% of n-propanol;
   (b) about 3% of 2-pyrrolidone;
   (c) about 1% of a vegetable derived modified tryglyceride;
   (d) about 6% of a terpene phenolic resin;
   (e) about 0.4% of a polyether modified dimethylpolysiloxane copolymer;
   (f) about 0.1% of a silicone glycol surfactant; and
   (g) about 7% of at least, one colorant to yield a detectable purple color when the ink composition is applied to a writable substrate.

24. The ink composition of claim 17 comprising:
   (a) about 71.50% of n-propanol;
   (b) about 3% of 2-pyrrolidone;
   (c) about 1% of a vegetable derived modified tryglyceride;
   (d) about 10% of a terpene phenolic resin;
   (e) about 0.4% of a polyether modified dimethylpolysiloxane copolymer;
   (f) about 0.1% of a silicone glycol surfactant; and
   (g) about 14% of at least one colorant to yield a detectable orange color when the ink composition is applied to a writable substrate.

* * * * *